(No Model.) 2 Sheets—Sheet 1.

L. A. DE MAYO.
COMBINED FREIGHT BUCKET AND TRUCK.

No. 385,849. Patented July 10, 1888.

WITNESSES:
W. R. Davis.
C. Sedgwick.

INVENTOR:
L. A. De Mayo.
BY Munn & Co.
ATTORNEYS.

N. PETERS, Photo-Lithographer, Washington, D. C.

(No Model.) 2 Sheets—Sheet 2.

L. A. DE MAYO.
COMBINED FREIGHT BUCKET AND TRUCK.

No. 385,849. Patented July 10, 1888.

WITNESSES:
W. R. Davis
C. Sedgwick

INVENTOR:
L. A. De Mayo
BY Munn & Co.
ATTORNEYS.

UNITED STATES PATENT OFFICE.

LOUIS A. DE MAYO, OF JERSEY CITY, NEW JERSEY.

COMBINED FREIGHT BUCKET AND TRUCK.

SPECIFICATION forming part of Letters Patent No. 385,849, dated July 10, 1888.

Application filed September 28, 1887. Serial No. 250,904. (No model.)

*To all whom it may concern:*

Be it known that I, LOUIS A. DE MAYO, of Jersey City, in the county of Hudson and State of New Jersey, have invented a new and Improved Freight Bucket and Truck, of which the following is a full, clear, and exact description.

My invention relates to an improvement in a combined freight bucket and truck, and has for its object to provide a means whereby freight may be conveniently carried from one portion of a warehouse to another, wheeled along a dock, or be hoisted from floor to floor of a warehouse, or in and out of a vessel's hold, and wherein, also, the freight may be conveniently dumped from the bucket without moving or tilting the truck.

The invention consists in the construction and combination of the several parts, as will be hereinafter fully set forth, and pointed out in the claims.

Reference is to be had to the accompanying drawings, forming a part of this specification, in which similar letters of reference indicate corresponding parts in all the figures.

Figure 1:
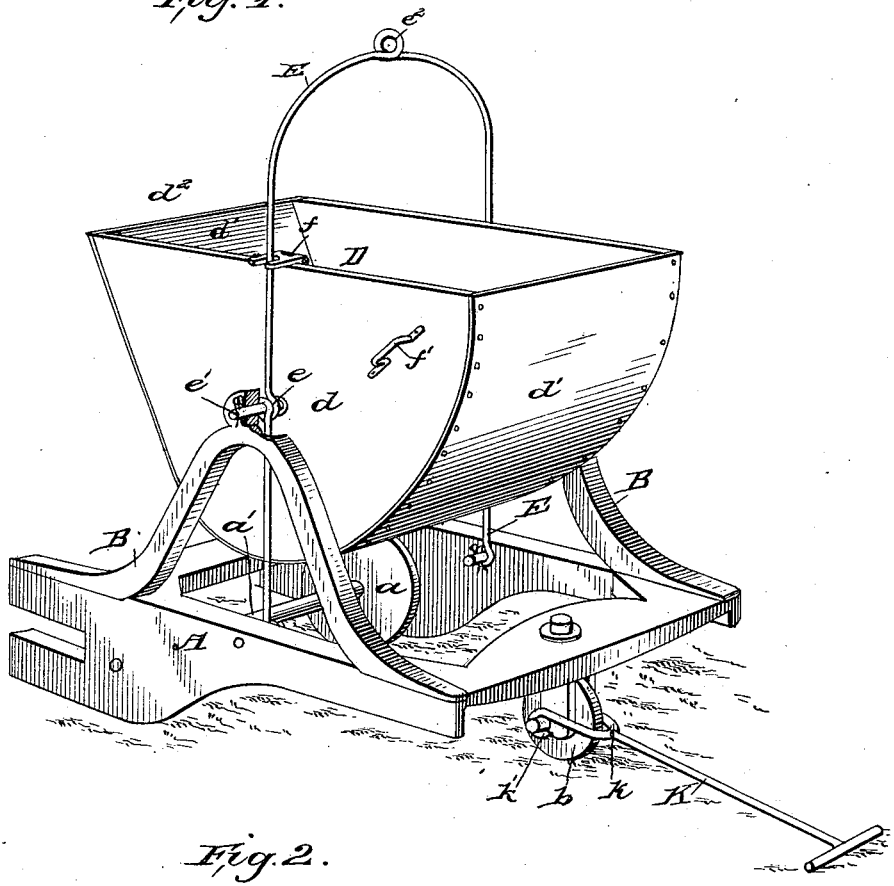
Figure 2:
Figure 3:
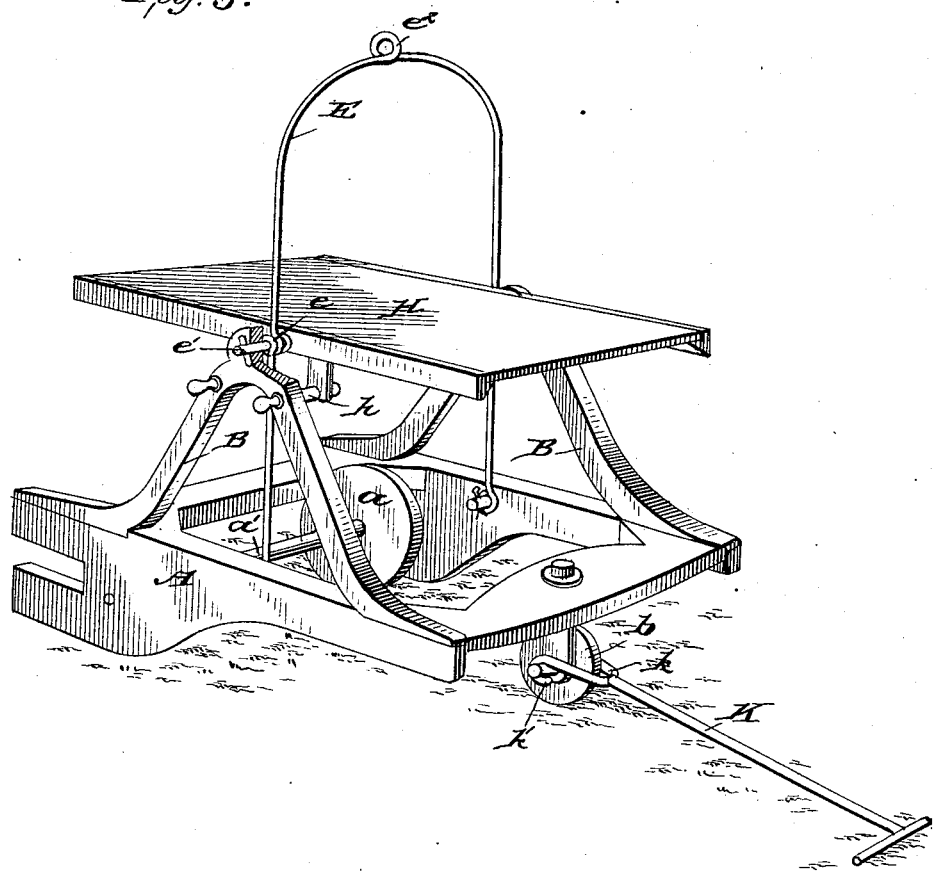

Figure 1 is a perspective view of the combined truck and bucket, and Fig. 2 is a side elevation of the handle. Fig. 3 is a perspective view of the truck with a modified form of carrier attached.

In carrying out the invention a truck, A, is constructed from any suitable material, which preferably consists of an open frame mounted upon three wheels, two wheels, $a$, being secured upon a horizontal axle, $a'$, journaled transversely in one end of the truck. The other wheel, $b$, which is a caster-wheel, is pivoted centrally at the opposite end of the truck.

At each side of the truck a vertical standard, B, is attached or made integral therewith, which standards are in alignment one with the other, and the center of the standards in the same plane with the center of the truck at the sides. The standards are represented as more or less V-shaped in the drawings, that construction being preferable on account of lightness and strength. I do not, however, confine myself to that construction, as they may be made in a variety of shapes; but the centers of the standards in every event should align the center of the truck at the side. In the upper central portions of the standards a bucket-shaped carrier, D, is pivoted, the sides $d$ of which are more or less segmental, the curved surface being the under surface. The front edges of the sides are less curved than the rear edges and are made to shear outward to form, in combination with the metal bottom $d'$, a chute, $d^2$.

A rod, E, is attached to the inner face of the truck about centrally of one side, which rod is carried upward and bent upon itself to form an eye, $e$, through which one trunnion, $e'$, of the bucket is passed before entering the standard, and the said rod is further carried upward above and over the truck and provided centrally with another eye, $e^2$, thence downward to an attachment with the truck at a point opposite to attachment of the other end, a second eye $e$ having been formed therein to embrace the trunnion $e'$ secured to that side of the bucket. It will thus be observed that a U-shaped bail is produced, whereby the combined bucket and truck may be lifted either when empty or loaded in a convenient and effective manner.

The bucket is held in a horizontal position by means of a forked catch, $f$, hinged to one inner side of the tub, adapted to embrace one member of the bail E, as shown in Fig. 1. Upon the same side of the bucket to which the catch $f$ is hinged, outside and near the back, a handle, $f'$, is secured, whereby the bucket is manipulated.

As illustrated in Fig. 2, the carrier may consist of a platform, H, only, pivoted to the standards in like manner as the bucket, being held in a horizontal position by detachable pins $h$, passing through the standards and engaging the under side of the platform.

In operation the bucket or platform is loaded with merchandise on the dock, for instance, and wheeled to the vessel to be loaded, the tackle is made to engage the eye $e^2$, and the carrier and truck are hoisted and deposited on the deck or in the hold, as desired. After being wheeled to the proper place, the catch $f$ or the pins $h$, according to the style of carrier used, are detached and the load is automatically dumped.

To facilitate drawing the truck, a handle, K, is utilized, provided with a bifurcated end, $k$, having the members bent downward at the extremities to form hooks $k'$, which hooks are made to engage the pintles of the caster-wheel, as illustrated. When not needed the handle may be readily disengaged and set at one side.

Having thus described my invention, what I claim as new, and desire to secure by Letters Patent, is—

1. The combination, with a truck, of a carrier pivotally mounted thereon and a bail secured to the truck and to the trunnions of the carrier, substantially as described.

2. The combination, with a truck, of a carrier pivotally mounted thereon and a bail having its end secured to the truck and provided with eyes through which the trunnions of the carrier pass, substantially as herein shown and described.

3. The combination, with a truck and vertical aligning standards at each side, of a carrier pivoted in said standards over the truck, a bail attached to the sides of the truck within the standards, encircling the trunnions of the carrier, and projecting over the carrier, having an eye formed integral with its highest point, and means, substantially as described, for tripping the carrier.

4. The combination, with a truck, A, mounted upon wheels $a$ and $b$, and vertical standards B, secured to the truck at each side, of a carrier provided with trunnions $e'$, journaled in said standards, a bail, E, attached to the truck centrally inside the standards and projecting upward over the carrier, provided with aligning side eyes, $e$, adapted to encircle the trunnions, and an upper central eye, $e^2$, adapted for attachment to a hoist, and means, substantially as described, for retaining the carrier in a horizontal position.

5. The combination, with a truck, A, mounted upon wheels $a$ and $b$, parallel vertical standards B, secured to the truck at each side, and a detachable handle, K, adapted for attachment to one forward wheel of the truck, of a carrier, D, provided with an inclined spout, $d^2$, handle $f$, and trunnions $e'$, journaled in the standards, a bail, E, attached to the sides of the truck centrally inside the standards and projecting upward over the carrier, provided with aligning side eyes, $e$, adapted to encircle the trunnions $e'$, and an upper central eye, $e^2$, adapted for attachment to a hoist, and a forked catch, $f$, hinged to the carrier, adapted to engage the bail E, substantially as and for the purpose herein set forth.

LOUIS A. DE MAYO.

Witnesses:
WM. A. LANE,
WM. J. KENNEDY.